(12) United States Patent
Cuciurean-Zapan et al.

(10) Patent No.: US 9,001,399 B2
(45) Date of Patent: Apr. 7, 2015

(54) AUTOMATICALLY COMPENSATING FOR COLOR DIFFERENCES FROM SIDE 1 TO SIDE 2 OF A DOCUMENT SCANNING DEVICE

(71) Applicant: Xerox Corporation, Norwalk, CT (US)

(72) Inventors: Mihai Cuciurean-Zapan, Fairport, NY (US); Michael John Wilsher, Letchworth (GB)

(73) Assignee: Xerox Corporation, Norwalk, CT (US)

( * ) Notice: Subject to any disclaimer, the term of this patent is extended or adjusted under 35 U.S.C. 154(b) by 24 days.

(21) Appl. No.: 13/799,526

(22) Filed: Mar. 13, 2013

(65) Prior Publication Data

US 2014/0268258 A1    Sep. 18, 2014

(51) Int. Cl.
*H04N 1/60* (2006.01)

(52) U.S. Cl.
CPC ....................................... *H04N 1/60* (2013.01)

(58) Field of Classification Search
USPC ............... 358/1.9, 1.13, 1.15, 3.26, 406, 504, 358/505, 540, 463
See application file for complete search history.

(56) References Cited

U.S. PATENT DOCUMENTS

| | | | |
|---|---|---|---|
| 6,995,874 B1 * | 2/2006 | Cullen et al. ................. | 358/3.26 |
| 7,684,041 B2 * | 3/2010 | Ebita et al. .................... | 356/402 |
| 8,203,750 B2 * | 6/2012 | Bray et al. ..................... | 358/1.9 |
| 8,294,947 B2 * | 10/2012 | Yanagi ............................ | 358/1.9 |
| 8,684,490 B2 * | 4/2014 | Takagi et al. .................. | 347/19 |
| 8,705,124 B2 * | 4/2014 | Hirano ........................... | 358/1.9 |

OTHER PUBLICATIONS

Sharma et al., "The CIEDE2000 Color-Difference Formula: Implementation Nodes, Supplementary Test Data, and Mathematical Observations", Color Research and Application, vol. 30. No. 1, pp. 21-30, Feb. 2005.

* cited by examiner

*Primary Examiner* — Allen H Nguyen
(74) *Attorney, Agent, or Firm* — Philip E. Blair; Fleit Gibbons Gutman Bongini & Bianco P.L.

(57) ABSTRACT

What is disclosed is a system and method for compensating for side 1 to side 2 differences in a document scanning device. In one embodiment, the present method involves selecting at least one solid area patch printed in at least one reference color of a color space. The scan head of side 1 scans the patch to capture a first set of color values. The scan head of side 2 scans the same patch to capture a second set of color values. A regression method generates a coefficient matrix which minimizes a ΔE color difference metric between the first and second sets of color values. An image processing module associated with the side 2 scanner is programmed with the coefficient matrix and uses the coefficient matrix to adjust a color response of the side 2 scanner to compensate for side 1 to side 2 differences.

13 Claims, 5 Drawing Sheets

AUTOMATICALLY COMPENSATING FOR COLOR DIFFERENCES FROM SIDE 1 TO SIDE 2 OF A DOCUMENT SCANNING DEVICE

TECHNICAL FIELD

The present invention is directed to systems and methods for compensating for side 1 to side 2 scan head differences in a document scanning device capable of operating in a duplex mode, i.e., can scan both sides of a document in a single-pass.

BACKGROUND

Xerox® manufactures a variety of document reproduction devices which have scanners capable of operating in a duplex mode, i.e., the scanner can scan both sides of a document. To effectuate this, Xerox scanning devices have a first and second side, each with a respective scan head comprising a plurality of image sensors. Due to subtle differences in the side 1 and side 2 scanners, the scan heads may provide device dependent raw RGB values that are different between side 1 and side 2. In other words, color values captured by the image sensors of the scan head of the side 1 scanner may not be the same as the color values captured by the image sensors of the scan head of the side 2 scanner. This is due, in many respects, from the scan heads being produced by vendors using different parts and differing manufacturing processes. In order to match the output image quality of each scanner side when performing a copy/scan job when operating in a single-pass duplex mode, differences between the side 1 and side 2 scan heads need to be taken into account.

Accordingly, what is needed in this art are sophisticated systems and methods for compensating for side 1 to side 2 scan head differences in a document scanning device capable of operating in a duplex mode.

BRIEF SUMMARY

What is disclosed is a system and method for compensating for side 1 to side 2 scan head differences in a scanning device capable of scanning both sides of a document page in a single-pass. The present method advantageously overcomes the problems in the prior art while matching output image quality of each scanner side when performing a copy/scan job in a single-pass duplex mode.

In one embodiment, the present method involves selecting at least one solid area patch printed in at least one reference color of a standard color space. The scan head of side 1 of the scanning device is used to scan the solid area patch such that a first set of color values is acquired. In a similar manner, the side 2 scanner is used to scan the same solid area patch such that a second set of color values is acquired. Thereafter, a regression method is executed that generates a matrix of coefficients which minimizes a ΔE color difference metric between the first and second sets of color values. Embodiments for various color difference metrics are disclosed. An image processing module associated with the side 2 scanner is then programmed with the coefficient matrix. Thereafter, the image processing module processes the color values received from the side 2 scan head and processes those color values such that side 1 to side 2 scan head differences are automatically compensated for. Various embodiments of an image processing module are also disclosed.

Features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
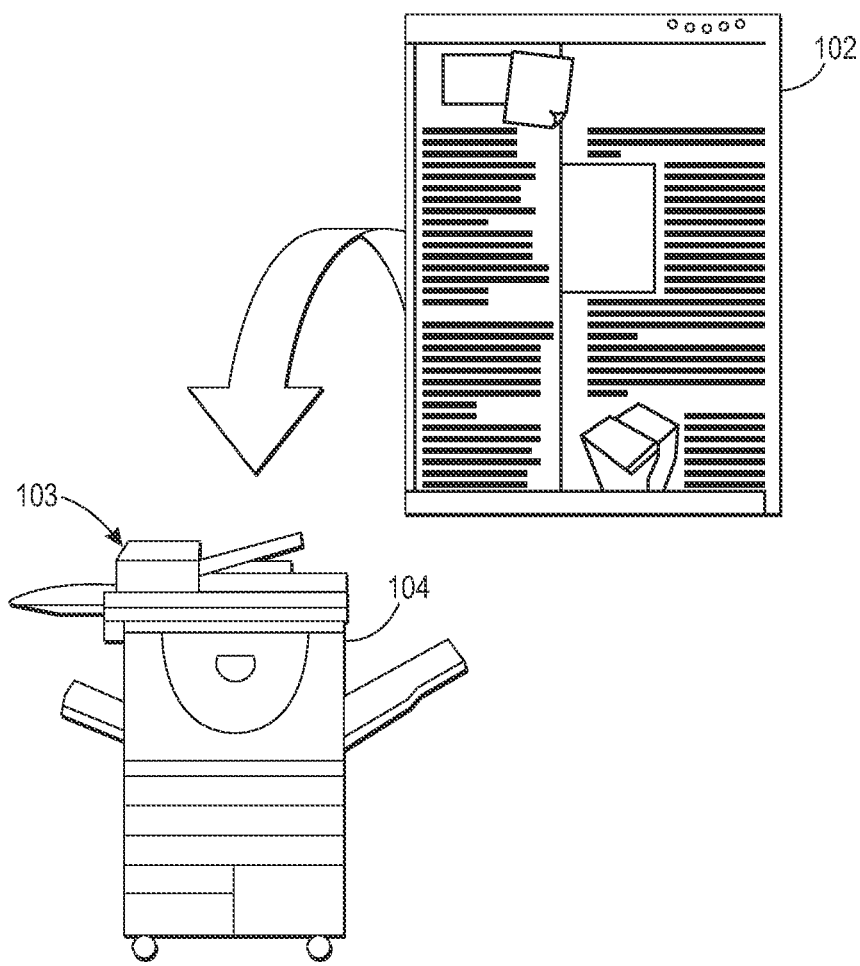
FIG. 1 illustrates an example double-sided document being scanned by a multi-function document reproduction system capable of operating in a single-pass duplex mode.

What is disclosed is a system and method for compensating for side 1 to side 2 scan head differences in a scanning device capable of scanning a document in a single-pass duplex mode. The teachings disclosed herein result in a matrix of coefficients which minimizes a ΔE color difference metric between a first and second sets of color values acquired by a side 1 and side 2 scanner, respectively. The coefficient matrix is used to program an image processing module associated with the side 2 scanner. An image processing module associated with the side 1 scanner with an identity matrix. In such a manner, a color response of the side 2 scanner is adjusted such that a color difference from side 1 to side 2 is automatically compensated for.

It should be understood that one of ordinary skill in this art should be readily familiar with the various aspects of document reproduction systems, in particular with scanning devices, scan heads, image sensors, and color measurement, as taught in "*Control of Color Imaging Systems: Analysis and Design*", CRC Press (2009), ISBN-13: 9780849337468, "*Digital Color Imaging Handbook*", CRC Press (2003), ISBN-13: 9780849309007, and "*Measuring Colour*", Fountain Press Ltd, (2001), ISBN-13: 9780863433870, all of which are incorporated herein in their entirety by reference.

NON-LIMITING DEFINITIONS

A "color space", as used herein, refers to any color space that is used to define or describe color. CIE color space refers to any color space based on a CIE standard. Example CIE defined color spaces are: CIEXYZ, CIELAB, CIELUV, CIEYUV, and CIEUVW. CIE refers to the Commission Internationale d'Eclairage which provides descriptions of colors visible to the human eye. The CIE was created to serve as a device-independent model to be used as a color reference. The L*a*b* color space is a color-opponent space whose coordinates are given by {L*, a*, b*} with dimension L* for luminance and a* and b* for the color-opponent dimensions based on the non-linearly compressed CIEXYZ color space coordinates. The RGB color space is an additive color space that is based on the RGB color model. Example RGB color spaces are: ISO-RGB, Extended ISO-RGB, sRGB, scRGB, ROMM RGB, Apple RGB, PhotoPro RGB, Adobe RGB, and Adobe Wide Gamut. CMYK color space refers to any subtractive color space. CMYK refers to the four inks used in some color printing: Cyan, Magenta, Yellow, and Black. Example CMYK color spaces are: CMYK, CcMmYK, cmyk, and CMYKOV. The YUV color space encodes a color image or video by taking human perception into account thereby allowing reduced bandwidth for chrominance components. Example YUV color spaces are: YUV(PAL), Y'UV, YDbDr (SECAM), YIQ(NTSC), YCbCr, YPbPr, and xvYCC. The HSV color space, also known as HSB (hue, saturation, brightness), is a transformation of the RGB color space. Its components and colorimetry are relative to the RGB color space from which it was derived. The HSL color space is quite similar to HSV with lightness replacing brightness in the transformation. The difference is that the brightness of a pure color is equal to the brightness of white. While the lightness of a pure color is equal to the lightness of a medium gray. Example HSL color spaces are: HSI (hue, saturation, intensity) and HSD (hue, saturation, darkness). The LMS color space is represented by the responsivity (sensitivity) of the three types of cones of the human eye at long, medium and short wavelengths. It is common to use the LMS color space when performing chromatic adaptation (i.e., estimating the appearance of a sample color under different illuminants). Various other lesser-used color spaces include: RYB, NCS, PMS, RAL, OSA-UCS, RG, DIN, PCCS, ABC, DCA, JIS-Z8102, ISCC-NBS, Hexachrome, Coloroid, Ostwald, Munsell, and Imaginary. The reader is directed to: "*Colorimetry: Understanding the CIE System*", Wiley-Interscience (2007), ISBN-13: 9780470049044, which is incorporated herein in its entirety by reference.

A "solid area color patch" refers to a color printed at the solid area level. The solid area level describes an amount of area coverage to a maximum reasonable density given the properties of the printer hardware rendering that color patch to an output print. Printing at the solid area level involves transferring a continuous amount of colorant to all locations within that area of the media substrate. In a digital printer that uses halftoning, the solid area level is 100% area coverage, i.e., all the halftone dots are completely filled in. In the digital document reproduction arts, the term 'solid area' is synonymous with 100% area coverage.

A "single-pass duplex mode" refers to the ability of a scanning device to scan both sides of a document print in the same pass, i.e., without having to physically remove the document from the platen and turn it over so that the other side of the document can then be scanned.

A "scanning device" or simply "scanner", for the purposes hereof, is an image input device with a first and second side which optically scans both sides of a hardcopy print of a document to obtain a digitized image thereof. Scanning devices capable of operating in a duplex mode have two scan heads; one positioned on a side 1 and another positioned on a side 2. Commonly available scanning devices typically utilize a plurality of specialized receptors (image sensors) mounted on the scan head which moves horizontally beneath a platen and scans the media placed thereon by sensing a reflected light source. Many scanners incorporate a Charge Coupled Device (CCD) or a Contact Image Sensor (CIS) as their receptors. Pixels of an image of the scanned document have an associated value such as, for instance, a color, intensity, lightness, brightness, or some mathematical transformation thereof. Color values generated by the scan heads are manipulated in accordance with the teachings hereof by an image processing module. FIG. 1 shows an example double-sided document 102 being provided to a document reproduction system 103 with a scanning device 104 capable of operating in a single-pass duplex mode. Document reproduction system 103 has image processing modules configured therein, each associated with one side of the scanning device.

Figure 2:
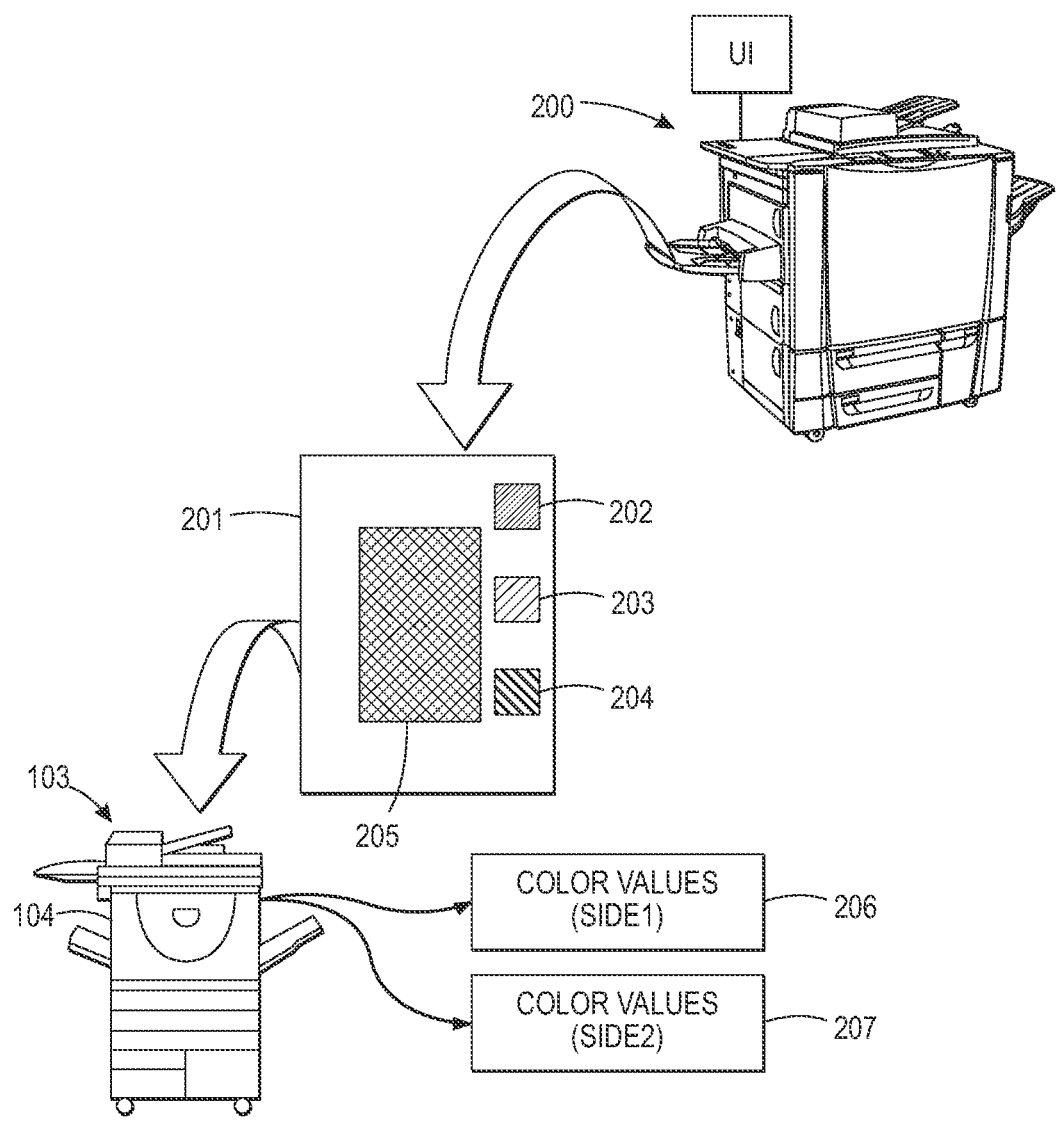
FIG. 2 shows a color marking device 200 having printed on media substrate 201 a plurality of example solid area patches (at 202, 203, 204 and 205) in different reference colors.

A "reference color" refers to any color that is desired to be used as a reference for the purposes hereof. A reference color may be a color proof supplied by a manufacturer in the form of a colored sample. FIG. 2 shows an example color marking device 200 having printed on media 201 a plurality of example solid area patches (at 202, 203, 204 and 205) in different reference colors. The printed color patches are provided to document reproduction system 103 wherein each of a side 1 and side 2 of the scanning device 104 scans the printed solid area patches to capture a first and second set of color values, at 206 and 207, respectively.

An "image processing module" refers to a system comprising, at least in part, a processor and a memory for executing programmable machine readable instructions. In accordance with the teachings hereof, the image processing modules uses a matrix of coefficients to adjust a color response of the side 2 scanner to compensate for color differences from side 1 to side 2. The image processing module may comprise various functions, features, and capabilities of a special purpose processor such as an ASIC which may be integrated, in whole or in part, with a system or sub-system of the document reproduction system wherein the scanning device is incorporated. The image processing module may be placed in communication with a computer workstation, one or more storage devices, and other devices, over a wired or wireless network.

"Compensate for a color difference" means using the matrix of coefficient to adjust color values obtained from a side 2 scan head such that a color difference between the first and second color values is minimized. In one embodiment, registers are programmed with the coefficients which, in turn, are used by an image processing module associated with the side 2 scan head to adjust a corresponding matrix of color values obtained by the side 2 scan heads such that the color values resulting therefrom are within the selected color difference metric with respective color values captured using the side 1 scan head. The coefficients may be weighted such that certain colors are enhanced or emphasized over other colors. Depending on the implementation, compensating for a color difference between the side 1 and side 2 scan heads may also include signaling a controller to adjust a color response of the scan heads themselves.

A "storage device" refers to any device or system capable of storing electronic data in a digital form. Example storage devices include RAM, ROM, cache memory, CD-ROM, DVD, flash drives, USB devices, and internal/external hard drives.

Computing a ΔE Color Difference Metric

A "ΔE color difference metric" refers to a metric for calculating an amount of a color difference between a color value and a value of a known reference color. This color difference can be Euclidean, CIEDE2000, or any other equivalent metric that can be expressed in terms of a deltaE.

In one embodiment, the ΔE color difference metric comprises a Euclidean distance between two colors. For example, in a L*a*b* space having coordinates in terms of {L*, a*, b*}, the Euclidean distance can be expressed as:

$$\Delta E_{ab}^* = \sqrt{(\Delta L^*)^2 + (\Delta a^*)^2 + (\Delta b^*)^2}. \tag{1}$$

In a cylindrical coordinate representation of a L*a*b* space, a Euclidean distance between two colors $x_1$ and $x_2$ having coordinates $\{L_1^*, h_1^*, C_1^*\}$ and $\{L_2^*, h_2^*, C_2^*\}$, respectively, can be expressed as:

$$\Delta E_{ab}^* = \sqrt{(\Delta L^*)^2 + C_1^* + C_2^* - 2C_1^* C_2^* \cos(h_2^* - h_1^*)^2}. \quad (2)$$

The CIEDE2000 color-difference formula is based on the CIELAB color space. Given a pair of color values in CIELAB space $\{L_1^*, a_1^*, b_1^*\}$ and $\{L_2^*, a_2^*, b_2^*\}$ the CIEDE2000 color difference is computed in a manner described in the paper entitled: "*The CIEDE2000 Color-Difference Formula: Implementation Nodes, Supplementary Test Data, and Mathematical Observations*", G. Sharma, W. Wu, E. N. Dalal, Color Research and Application, Vol. 30. No. 1, (February 2005), which is incorporated herein in its entirety by reference.

It should be appreciated that transformations between various color spaces are well understood in the color sciences. Such transformations convert color values form other color spaces into L*,a*,b*, from which a color difference can be computed using any of the methods disclosed herein. It should be appreciated that any color difference metric that can be expressed in terms of $\Delta E$, can be utilized. Various $\Delta E$ color difference metrics may be displayed on a display device via a menu for a user selection of the metric desired to used.

Introduction to Regression Methods

Linear regression is a probability and statistical analysis technique which models a relationship between two or more variables and a response variable. Linear regression attempts to fit a linear equation to the observed data such that every value of the independent variable x is associated with a value of a dependent variable y. More generally, the fitted linear regression model identifies the relationship between a single predictor variable $x_j$ and a response variable y when all the other predictor variables are held fixed. The regression method generates a matrix of coefficients β which minimizes a $\Delta E$ color difference metric between the first and second sets of color values obtained from the side 1 and side 2 scan heads having scanned the solid area patches.

The interpretation of $\beta_j$ is the expected change in y for a one-unit change in $x_j$, (i.e., the expected value of the partial derivative of y with respect to $x_j$) when the other covariates are fixed. This is sometimes called the unique effect of $x_j$ on y.

The regression line for p explanatory variables, $x_1, x_2, \ldots, x_p$, can be defined by a relationship which describes how the mean response $\mu_y$ changes with the explanatory variables. In one embodiment, this relationship is given by:

$$\mu_y = \beta_0 + \beta_1 x_1 + \beta_2 x_2 + \ldots + \beta_p x_p \quad (3)$$

In Eq. (3), the observed values for the dependent variable y vary about their respective means and are assumed to have the same standard deviation.

Since the observed values for y vary about their means, a multiple regression model can be expressed as: DATA=FIT+RESIDUAL, where 'FIT' represents the expression $\beta_0 + \beta_1 x_1 + \beta_2 x_2 + \ldots + \beta_p x_p$ and 'RESIDUAL' represents the deviations of the observed values y from their respective means $\mu_y$. The notation for the model deviations is typically given as ϵ.

Thus, for i=1 . . . n observations, one embodiment of a model for multiple linear regression can be written as:

$$y_i = \beta_0 + \beta_1 x_{i1} + \beta_2 x_{i2} + \ldots + \beta_p x_{ip} + \epsilon_i = x_i^T \beta + \epsilon_i \quad (4)$$

where $\hat{\beta}$ is a p-dimensional parameter vector comprising elements $\beta_0, \beta_1, \ldots, \beta_p$ called regression coefficients, and T denotes a matrix transpose operation where $x_i^T \beta$ represents the inner product between vectors $x_i$ and the regression coefficients of the vector $\hat{\beta}$.

Fitted values $b_0, b_1, \ldots, b_p$ can be used to estimate the p-dimensional parameter vector $\hat{\beta}$ of the population regression line. In the least-squares model, the best-fitting line for the observed data is calculated by minimizing the sum of the squares of the vertical deviations from each data point to the line. The least-squares estimates $b_0, b_1, \ldots, b_p$ can be computed using standard statistical software found in various streams of commerce, given the relationship:

$$b_0 + b_1 x_{i1} + b_2 x_{i2} + \ldots + b_p x_{ip} \quad (6)$$

where the residuals $e_i$ are equal to a difference between the observed and fitted values, i.e., $y_i - \hat{y}_i$. The sum of the residuals is equal to zero. A level C confidence interval for each coefficient $\beta_j$ may be determined from each respective estimate $b_j$ using the computed standard deviations.

It should be appreciated that there are assumptions made by regression models that one of ordinary skill would be familiar with such as, for example, linearity, constant variance, independence, to name a few. The reader is respectfully directed to: "*Applied Linear Regression*", Wiley (2005), ISBN-13: 978-0471663799 and "*Regression Analysis by Example*", Wiley-Interscience (2006), ISBN-13: 978-0471746966, both of which are incorporated herein in their entirety by reference. The reader is also directed to Chapter 9 of the Handbook of Statistics, entitled: "*Numerical Aspects of Solving Linear Least Squares Problems*", North-Holland (1993), ISBN 0-444-88096-8, which is also incorporated herein in its entirety by reference.

Example Flow Diagram

Figure 3:
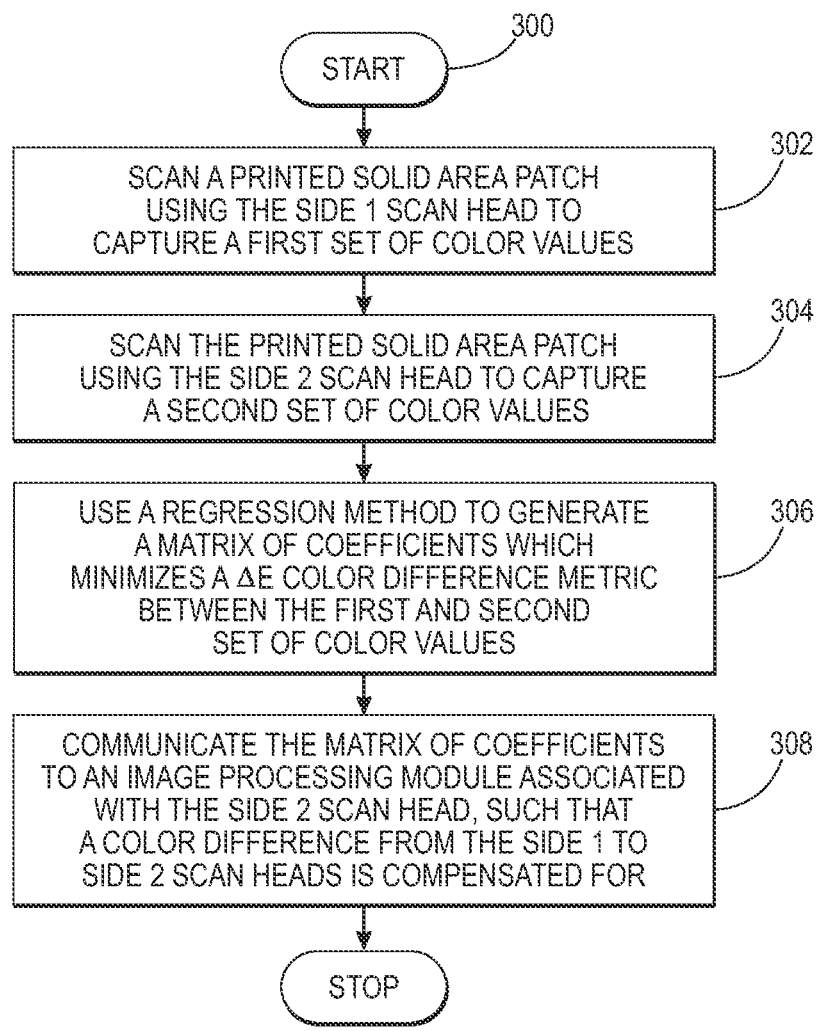
FIG. 3 is a flow diagram which illustrates one example embodiment of the present method for compensating for side 1 to side 2 scan head differences in a scanning device capable of scanning a document in a duplex mode.

Reference is now being made to the flow diagram of FIG. 3 which illustrates one example embodiment of the present method for compensating for side 1 to side 2 scan head differences in a scanning device capable of scanning a document in a duplex mode. Flow processing begins at 300 and immediately proceeds to step 302.

At step 302, scan a solid area patch using the side 1 scan head to capture a first set of color values.

At step 304, scan the solid area patch using the side 2 scan head to capture a second set of color values. An example document reproduction system having a scanning device with side 1 and side 2 scan heads for scanning solid area patches to produce a first and second set of color values, is shown in FIG. 2.

At step 306, use a regression method to generate a matrix of coefficients which minimizes a selected $\Delta E$ color difference metric between the first and second sets of color values. Various embodiments of a $\Delta E$ color difference metric are disclosed herein.

At step 308, communicate the matrix of coefficients to an image processing module associated with the side 2 scanner such that a color difference from the side 1 to side 2 scan heads can be compensated for. Thereafter, in this embodiment, further processing stops.

It should be appreciated that the flow diagrams hereof are illustrative. One or more of the operative steps illustrated in the flow diagram of FIG. 3 may be performed in a differing order. Other operations may be added, modified, enhanced, or consolidated. Variations thereof are intended to fall within the scope of the appended claims. Various aspects of the method of FIG. 3 may be implemented in software which may include object or object-oriented structures and techniques. Such software may comprise portable code that can be executed on a variety of platforms. The disclosed methods may be implemented partially or fully in hardware operating in conjunction with software.

Block Diagram of Image Processing System

Figure 4:
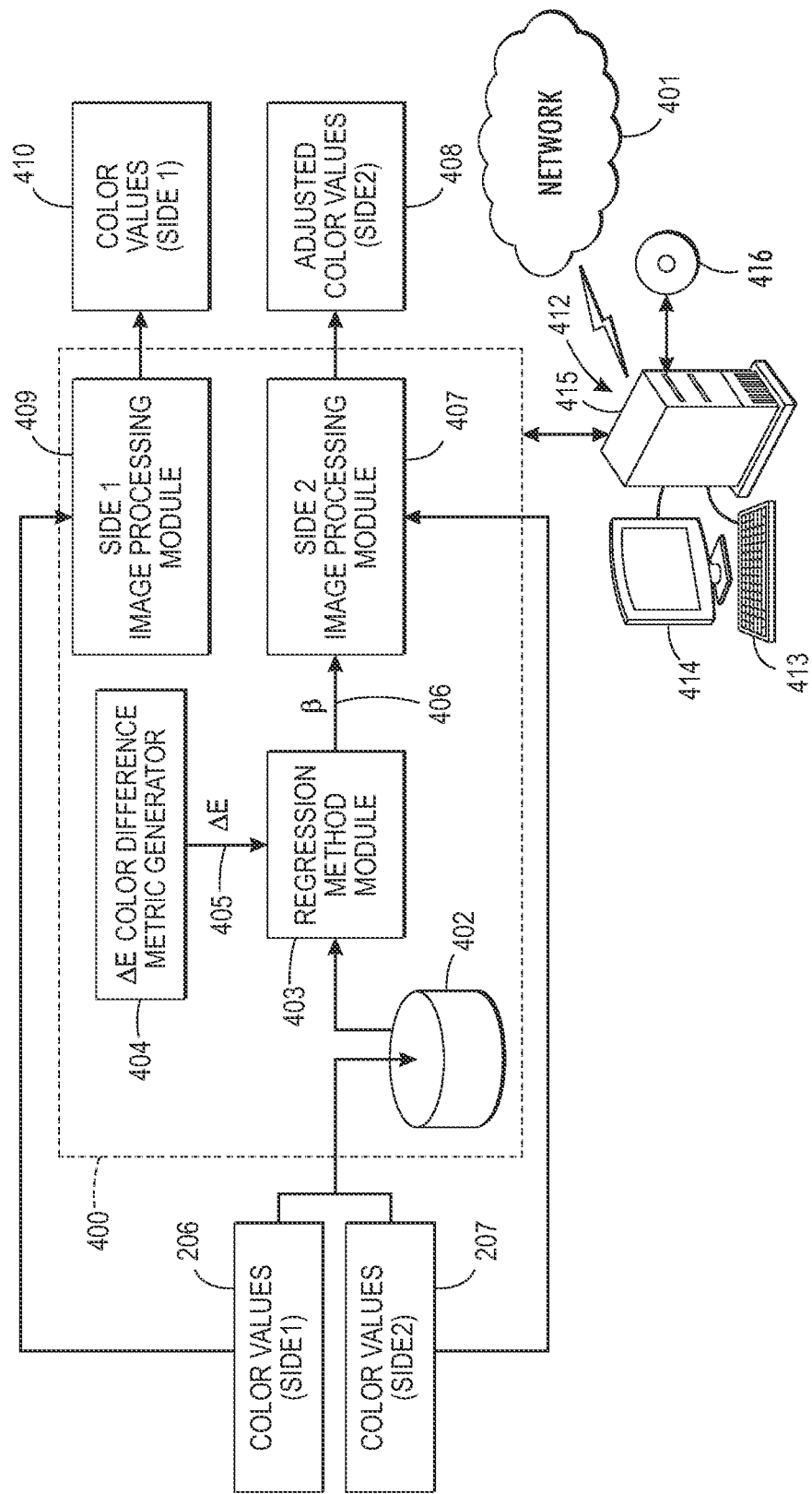
FIG. 4 illustrates a block diagram of one example image processing system for implementing various aspects of the present method as described with respect to the flow diagram of FIG. 3.

Reference is now being made to FIG. 4 which illustrates a block diagram of one example image processing system 400 for implementing various aspects of the present method as described with respect to the flow diagram of FIG. 3.

In FIG. 4, the first and second color values, at 206 and 207, which have been captured by the side 1 and side 2 scan heads, respectively, having scanned the solid area patches are received into the image processing system 400 and stored to storage device 402. Regression Method Module 403 retrieves the first and second sets of color values from the storage device and receives, from the ΔE Color Difference Metric Generator 404, a metric ΔE (at 405). The Regression Method Module 403 generates a matrix of coefficients β (at 404) which minimizes the received ΔE metric 405 between these first and second sets of color values 206 and 207. The image processing module 407 associated with the side 2 scanner receives the matrix of coefficients and applies those coefficients to the matrix of second set of color values 207 captured by the side 2 scan head to adjust those color values and to generate, as output, a set of adjusted color values 408. The image processing module 409 associate with the side 1 scan heads receives the first set of color values 206 and, using the identity matrix on the matrix of first set of color values generates, as output, a set of color values 410. Output matrices of color values 410 and 408 are provide to other image processing modules in the image path. It should be appreciated that any of the modules and/or processing units of FIG. 4 are in communication with storage device 402 via pathways shown and not shown and may store/retrieve therefrom various data, parameters, values, functions, and machine readable/executable program instructions as are required to perform their various functions. In some examples, the image processing module 407 and the image processing module 409 are the same module.

The system of FIG. 4 is further shown having been placed in communication with a workstation 412 which includes a graphical user interface comprising a keyboard 413 and monitor 414. Computer case 415 houses a motherboard, processor, hard drive, CD-ROM drive, and a network card. Rewriteable media 416 stores executable machine readable program instructions and data. Monitor 414 is in communication with a graphics video card contained within computer case 415. Workstation 412 is in communication with one or more remote devices over network 401. The workstation 412 has an operating system and other specialized software configured to display numeric values, text, scroll bars, dials, slideable menu bars, pull-down menus, selectable options, buttons, and the like, for entering, selecting, modifying, and accepting any information needed for processing. The embodiment shown is only illustrative and may include any other functionality which any display device known in the arts is capable of displaying. A user may utilize the functionality of the workstation to make a selection of one or more color values desired to be manipulated or otherwise compensated for in accordance with the teachings hereof. The user may use the display to view the computed color differences or to see how well the differences from the side 1 to side 2 scan heads have been compensated for. The user may also use the workstation to make various other selections such as, for example, initiating the operation of various modules and processing units comprising the image processing system 400, or to review the results thereof. Software to configure a user interface or any portion thereof to display/enter/accept data is generally customizable. Default settings and initialization parameters can be retrieved from internal memory or readable medium 416, as needed, and/or communicated to a remote device over network 401. Each of the modules and processing units of the image processing system of FIG. 4 may further be in communication with one or more remote devices over network 401. Although shown as a desktop computer, the workstation may comprise a laptop, a mainframe, a client/server, or a special purpose computer such as an ASIC. It should be appreciated that some or all of the functionality for any of the modules may be embedded into scanning device 104 or performed, in whole or in part, by the workstation.

Various modules of the embodiment of FIG. 4 may designate one or more components which may, in turn, comprise software and/or hardware designed to perform the intended function. Each module may have a specialized processor and memory capable of executing machine readable program instructions to perform an intended function and communicate a result thereof to one or more other modules. A plurality of modules may collectively perform a single function. A module may comprise an ASIC, electronic circuit, or a special purpose computer. A plurality of modules may be executed by either a single special purpose computer or a plurality of systems operating in parallel. Connections between modules include both physical and logical connections. Modules may further include one or more software/hardware modules which may further comprise an operating system, drivers, device controllers, and other apparatuses some or all of which may be connected via a network. It is also contemplated that one or more aspects of the present method may be implemented on a dedicated computer system and may also be practiced in distributed computing environments where tasks are performed by remote devices that are linked through a network.

Example Special Purpose Computer

Figure 5:
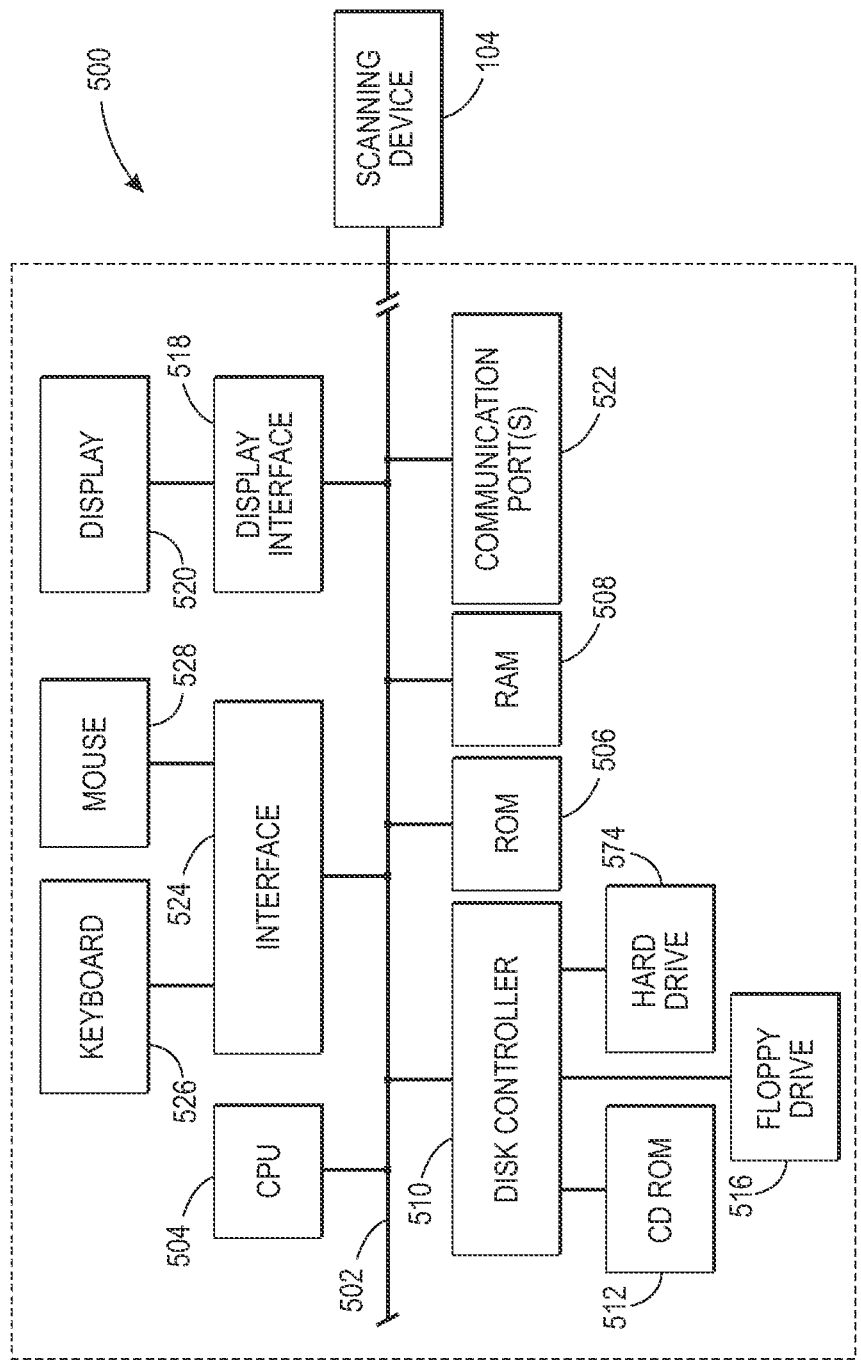
FIG. 5 illustrates a block diagram of one example embodiment of a special purpose computer system for implementing one or more aspects of the present method as described with respect to the flow diagram of FIG. 3 and the block diagram of FIG. 4.

Reference is now being made to FIG. 5 which illustrates a block diagram of one example embodiment of a special purpose computer system for implementing one or more aspects of the present method as described with respect to the flow diagram of FIG. 3 and the block diagram of FIG. 4.

Special purpose processor 500 executes machine executable program instructions. Communications bus 502 serves as an information highway interconnecting the other illustrated components. The computer incorporates a central processing unit (CPU) 504 capable of executing machine readable program instructions for performing any of the calculations, comparisons, logical operations, and other program instructions for performing the methods disclosed herein. The CPU is in communication with Read Only Memory (ROM) 506 and Random Access Memory (RAM) 508 which, collectively, constitute storage devices. Such memory may be used to store machine readable program instructions and other program data and results. Controller 510 interfaces with one or more storage devices 514. These storage devices may comprise external memory, zip drives, flash memory, USB drives, memory sticks, or other storage devices with removable media such as CD-ROM drive 512 and floppy drive 516. Such storage devices may be used to implement a database wherein various records of objects are stored for retrieval. Example computer readable media is, for example, a floppy disk, a hard-drive, memory, CD-ROM, DVD, tape, cassette, or other digital or analog media, or the like, capable of having embodied thereon a computer readable program, logical instructions, or other machine readable/executable program instructions or commands that implement and facilitate the function, capability, and methodologies described herein. The computer readable medium may additionally comprise computer readable information in a transitory state medium such as a network link and/or a network interface, including a wired network or a wireless network, which allows the computer system to read such computer readable information. Computer programs may be stored in a main memory and/or a secondary memory.

Computer programs may also be received via the communications interface. Any of the modules of FIG. 5 may use the communications interface to communicate with any of sides 1 and 2 of the scanning device 104.

The computer readable medium is further capable of storing data, machine instructions, message packets, or other machine readable information, and may include non-volatile memory. Such computer programs, when executed, enable the computer system to perform one or more aspects of the methods herein. Display interface 518 effectuates the display of information on display device 520 in various formats such as, for instance, audio, graphic, text, and the like. Interface 524 effectuates a communication via keyboard 526 and mouse 528. Such a graphical user interface is useful for a user to review displayed information in accordance with various embodiments hereof. Communication with external devices may occur using example communication port(s) 522. Such ports may be placed in communication with the Internet or an intranet, either by direct (wired) link or wireless link. Example communication ports include modems, network cards such as an Ethernet card, routers, a PCMCIA slot and card, USB ports, and the like, capable of transferring data from one device to another. Software and data transferred via communication ports are in the form of signals which may be any of digital, analog, electromagnetic, optical, infrared, or other signals capable of being transmitted and/or received by the communications interface. Such signals may be implemented using, for example, a wire, cable, fiber optic, phone line, cellular link, RF, or other signal transmission means presently known in the arts or which have been subsequently developed.

Various aspects of the disclosed method may be implemented as software executed on a programmed general purpose computer, a special purpose computer, a micro-processor, or the like. The methods described above can be readily implemented in hardware or software using any known or later developed systems or structures, devices and/or software by those skilled in the applicable art without undue experimentation from the functional description provided herein together with a general knowledge of the relevant computer arts. The teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof can be implemented as a routine embedded on a personal computer or as a resource residing on a server or workstation, such as a routine embedded in a plug-in, a driver, a device controller, or the like. One or more of the capabilities hereof can be emulated in a virtual environment as provided by an operating system, specialized programs or leverage off-the-shelf software such as that in Windows, Java, and the like.

One or more aspects of the methods described herein are intended to be incorporated in an article of manufacture, including one or more computer program products, having computer usable or machine readable media. The article of manufacture may be included on at least one storage device readable by a machine architecture embodying executable program instructions capable of performing the methods described herein. The article of manufacture may be sold, leased, or otherwise provided separately either alone or as part of an add-on, update, upgrade, or product suite.

It will be appreciated that various of the above-disclosed and other features and functions, or alternatives hereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method for compensating for side 1 to side 2 scan head differences in a scanning device capable of scanning a document in a duplex mode, the method comprising:
   scanning, using a side 1 scanner, at least one solid area patch printed in at least one reference color to capture a first set of color values;
   scanning, using a side 2 scanner, said same solid area patch to capture a second set of color values;
   generating, using a regression method, a matrix of coefficients, wherein multiplying each color value within said second set of color values by said matrix of coefficients minimizes a ΔE color difference metric between said first and second sets of color values;
   scanning a first image using said side 1 scanner;
   generating a first set of output color values corresponding to said first image, said first set of output color values comprising pixels within said first image multiplied by an identity matrix;
   scanning a second image using said side 2 scanner; and
   generating a second set of output color values corresponding to said second image, said second set of output color values comprising pixels within said second image multiplied by said matrix of coefficients.

2. The method of claim 1, further comprising weighting any of said coefficients such that a color response of certain colors is enhanced.

3. The method of claim 1, wherein said ΔE color difference metric comprises any of: a Euclidean distance between two colors, and a CIEDE2000 metric.

4. The method of claim 3, wherein said Euclidean distance between two colors in a color space with coordinates expressed in terms of {L*, a*, b*}, comprises:

$$\Delta E^*_{ab} = \sqrt{(\Delta L^*)^2 + (\Delta a^*)^2 + (\Delta b^*)^2}.$$

5. The method of claim 1, wherein said regression method comprises any of: a linear regression method, and a least squares method.

6. The method of claim 1, wherein one processor implements said generating a first set of output color values and said generating a first set of output color values.

7. The method of claim 1, wherein said step of generating said matrix of coefficients are performed in response to a user initiated event on a user interface of a document reproduction system.

8. A system for compensating for side 1 to side 2 scan head differences in a scanning device capable of scanning a document in a duplex mode, the system comprising:
   a storage device storing a first set of color values acquired by scanning at least one solid area patch using image sensors of a side 1 scan head of said scanning device, said storage device further storing a second set of color values acquired by scanning said same solid area patch using image sensors of a side 2 scan head of said scanning device, said solid area patch having been printed in at least one reference color;

a processor in communication with said storage device, said processor executing machine readable program instructions for performing:
    retrieving, from said storage device, said first and second sets of color values; and
    executing a regression method that generates a matrix of coefficients, wherein multiplying each color value within said second set of color values by said matrix of coefficients minimizes a ΔE color difference metric between said first and second sets of color values;
a side 1 image processing module associated with said side 1 scan head, said image processing module configured to generate a first set of output color values corresponding to a first image, said first set of output color values comprising pixels within said first image multiplied by an identity matrix; and
a side 2 image processing module associated with said side 2 scan head, said side 2 image processing module configured to generate a second set of output color values corresponding to a second image, said second set of output color values comprising pixels within said second image multiplied by said matrix of coefficients.

9. The system of claim 8, further comprising a second processor configured to implement said side 1 image processing module and said side 2 image processing module.

10. The system of claim 8, wherein said regression method comprises any of: a linear regression method, and a least squares method.

11. The system of claim 8, further wherein at least one of said side 1 image processing module and said side 2 image processing module is further configured to weight coefficients such that a color response of certain colors is enhanced.

12. The system of claim 8, wherein said ΔE color difference metric comprises any of: a Euclidean distance between two colors, and a CIEDE2000 metric.

13. The system of claim 12, wherein said Euclidean distance between two colors in a color space with coordinates expressed in terms of {L*, a*, b*}, comprises:

$$\Delta E^*_{ab} = \sqrt{(\Delta L^*)^2 + (\Delta a^*)^2 + (\Delta b^*)^2}.$$

* * * * *